June 23, 1953 P. M. FREER 2,642,959
DISK BRAKE CONSTRUCTION
Filed Oct. 23, 1948 5 Sheets-Sheet 1

INVENTOR.
Phelps M. Freer
BY
Harness, Dickey & Pierce
ATTORNEYS

June 23, 1953     P. M. FREER     2,642,959
DISK BRAKE CONSTRUCTION
Filed Oct. 23, 1948     5 Sheets-Sheet 3

INVENTOR.
Phelps M. Freer.
BY
Harness, Dickey & Pierce
ATTORNEYS.

June 23, 1953 P. M. FREER 2,642,959
DISK BRAKE CONSTRUCTION
Filed Oct. 23, 1948 5 Sheets-Sheet 4

INVENTOR.
Phelps M. Freer.
BY
Harness, Dickey & Pierce
ATTORNEYS.

June 23, 1953 P. M. FREER 2,642,959
DISK BRAKE CONSTRUCTION
Filed Oct. 23, 1948 5 Sheets-Sheet 5

INVENTOR.
Phelps M. Freer.
BY
Harness, Dickey & Pierce
ATTORNEYS.

Patented June 23, 1953

2,642,959

UNITED STATES PATENT OFFICE 2,642,959

DISK BRAKE CONSTRUCTION

Phelps M. Freer, Detroit, Mich.

Application October 23, 1948, Serial No. 56,085

18 Claims. (Cl. 188—72)

This invention relates to braking devices in general but refers in particular to an improved disc brake construction.

It is notable that disc brakes have not been accepted by the automotive industry, in spite of the fact that they have certain inherent advantages from the standpoint of actual operation and performance over the conventional band type brakes. There are two principal reasons for this failure of the disc type brake to receive widespread application; first, the high cost of manufacture, and second, the relatively short life of the brake lining due to the low rate of heat dissipation.

It is the purpose of the present invention to eliminate the foregoing objections to disc type brakes and to provide certain other desirable features of construction. In contrast to disc brakes heretofore known, the brake of the present invention is exceedingly simple and inexpensive to manufacture. No machining is required to form the component parts and, in assembly, these parts simply fit together with only a few rivet and weld connections required. The second objection to disc brakes is eliminated in two ways. First, by the provision of a brake construction which includes a cooling system whereby a suitable coolant such as air may carry away sufficient heat to materially reduce braking temperatures and thereby prolong the life of the brake linings. Second, by the provision of a braking member to engage the brake shoe which is of a construction which interrupts the generation of frictional heat and which has a large area for radiating the heat developed and a large volume for absorbing heat developed. As an added feature of considerable practical importance, the invention provides a brake construction which is self-adjusting to compensate for wear of the brake lining. A further feature which makes the brake particularly desirable for modern automobiles in which a minimum-size brake is desired, is the high braking capacity of the present design which makes it possible to provide a highly effective brake which occupies only a small and compact space.

Various features of the invention may be employed in other types of brake construction as those in the art will realize after consideration of the accompanying drawings showing it embodied in a disc brake wherein.

Figures 1, 2, 3:
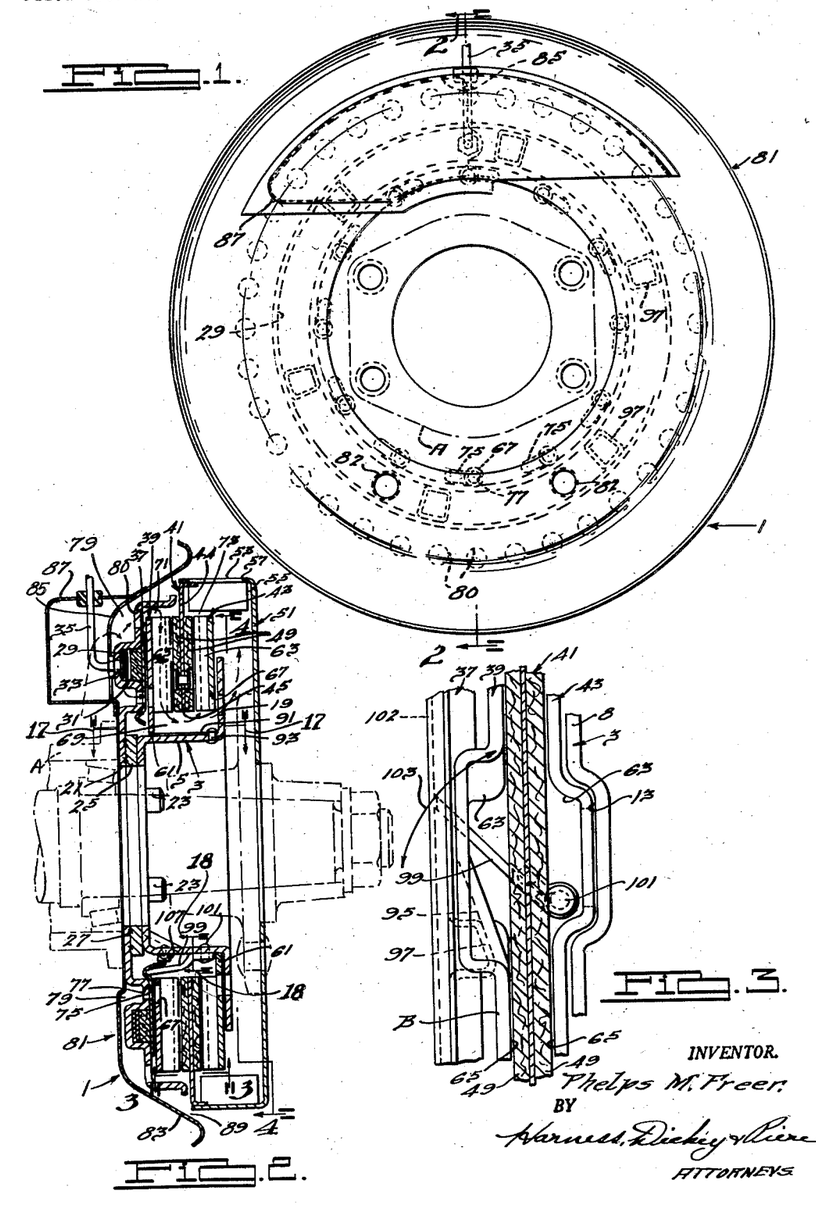
Figure 1 is a side elevation of one form of disc brake construction embodying the invention taken from the inboard side thereof, the brake being shown as it would appear in a vertical section through an automobile axle.
Fig. 2 is an axial section taken on the line 2—2 of Fig. 1.
Fig. 3 is a lateral section taken on the line 3—3 of Fig. 2 illustrating one form of wear compensating means.
Figures 10, 11:
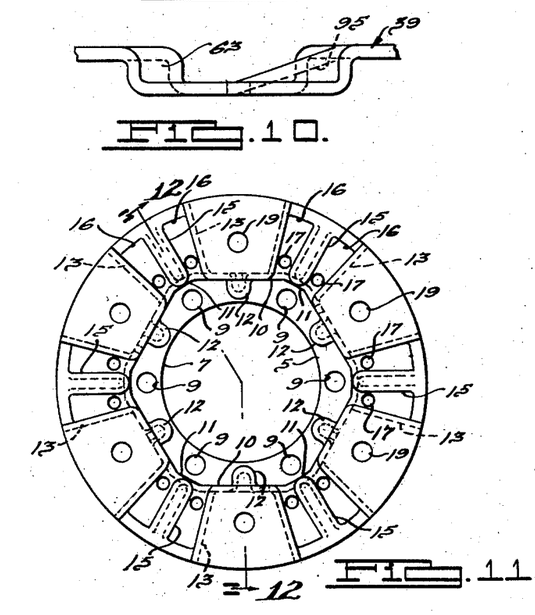
Fig. 10 is an end elevation of a portion of the inboard disc as observed from line 10—10 of Fig. 8.
Fig. 11 is a detail plan view of the mounting sleeve.
Figure 12:
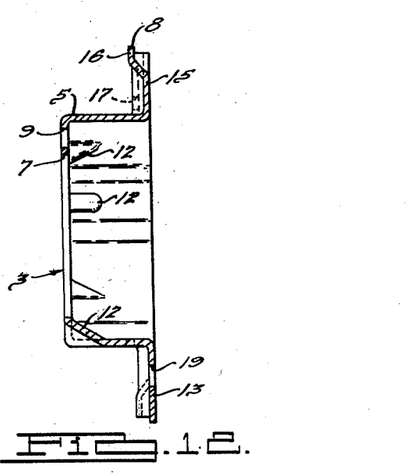
Fig. 12 is a section taken on line 12—12 of Fig. 11.

Referring first to Figs. 2, 11, and 12 of the drawings, it will be observed that the inner member 3 forms the mounting and support means for the rotary disc brake which will be generally designated by the reference numeral 1. The support member 3, or mounting sleeve, as it is referred to in practice, is broadly hatshaped in appearance, having a crown 5 with a large axial aperture 7 therein and a flange 8. The crown end of the sleeve 3 may be provided with a plurality of apertures 9 surrounding aperture 7 by means of which fixed connection with an automobile chassis, for example, may be achieved through the medium of bolts, rivets, or the like. The outer periphery of the crown 5 is adapted to prevent rotation of some members mounted thereon while permitting rotation of others. A preferred method of accomplishing this consists in forming the crown so that it is noncircular in cross section, the substantially hexagonal shape illustrated in Fig. 11 being suitable. The flat sides 10 of the hexagon prevent rotation of members fitted thereto while the circular segments 11 which join the sides 10 permit rotation of members fitted thereon. If desired, a plurality of inwardly extending striated ribs 12 may be formed in the side wall or peripheral portion of the crown 5. As shown, the ribs 12 taper inwardly as they approach the crown end of which they are joined. The ribs 12 perform the important function of increasing the strength and rigidity of the crown 5.

The flange 8 of the mounting sleeve 3 is preferably of a form which may be broadly described as corrugated. There are a plurality of radial channels 13 which, like the ribs 12, may conveniently be formed in symmetry with the sides of the hexagonal wall of crown 5. Intermediate the channels 13, a plurality of radial striated and axially tapered ribs 15 may be formed in such a manner as to provide on the outermost peripheral portion of the flange a plurality of annular segmental sections 16 which are closer to the end of crown 5 than any of the other parts of the flange 8 (Fig. 12). The upraised webs on either side of the ribs 15 between the ribs and the channels 13 may have apertures 17 formed therein and the channels 13 may be provided with longitudinal apertures 19 located on a somewhat larger diameter.

It will be evident to those in the art that the sleeve 3 is well adapted to large scale production. It can be completely formed from sheet metal by a series of drawing and pressing or stamping operations, no machining being necessary. Furthermore, as will become more apparent hereinafter, the dimensional requirements are not at all exacting, another feature which is particularly desirable in quantity production.

As best indicated in Fig. 2, the crown end of the mounting sleeve 3 is fixedly connected to a housing or backing plate 21 by means of bolts 23 which are threaded in the spacer ring 25 that is welded at 27 to the plate 21. The plate 21 is secured by suitable means (not shown) to the axle housing A or the like. An annular channel 29 is formed in the plate 21 and this serves as a cylinder for an annular expander tube or piston 31 of suitable construction. The wall of the channel 29 has an aperture 33 which receives a pressure fluid conduit 35 that delivers pressure fluid from the hydraulic brake actuating mechanism (not shown) to the underside of the piston 31. Variations in pressure cause movement of the piston 31 in an axial direction. Movement of the piston 31 is transmitted to a number of members which are mounted in series for axial movement on the sleeve 3. The first of these is a pressure plate or cam ring 37 which is in immediate engagement with the piston 31. The ring 37 engages a disc-like braking member 39 which in turn engages one face of the disc-type brake shoe 41. Another disc-like braking member 43 may be mounted on the sleeve 3 between the opposite face of the brake shoe 41 and the sleeve rim 8. In the preferred arrangement, which may, however, be reversed or otherwise modified, the braking members 39 and 43 are nonrotatable, being fitted to the flat sides 10 of the crown 5, and the brake shoe 41 is rotatable with the wheel or other object to be braked. In this arrangement the cam ring or pressure plate 37 is fitted to the circular segments 11 of the crown 5 and is therefore rotatable and means are provided so that such rotation of the cam ring 37 causes axial movement of the members 39 and 43 and shoe 41 which is substantially equal in amount to the loss of thickness of these parts due to wear. Because of this provision, it will be recognized that the stroke of piston 31 is substantially constant regardless of the condition of the brake linings or, in other words, the brake is self-adjusting.

The brake shoe 41 comprises a disc 44 which may be formed of metal and is preferably provided with a central aperture 45 substantially larger than the crown 5 of sleeve 3 and with a notched or slotted (Figs. 4, 5 and 16) peripheral rim or flange 47, the brake linings 49 being riveted or otherwise suitably secured to the radial faces of the disc 44. The shoe 41 is rotatably connected by means of its slotted flange 47 to an impeller 51. The impeller 51 resembles the brake drum of conventional automobile wheels and is thus adaptable for permanent connection to the hub of a wheel (not shown). It has a peripheral rim 53 in which are formed a plurality of inwardly extending blades 55. The blades are preferably formed by inward deformation of sheared sections of the rim so as to provide a plurality of radial apertures 57 in the rim, these apertures serving as outlets for coolant air, as will be described hereinafter. The blades 55 of the impeller 53 fit in the notches 48 or slots in the rim of the brake shoes 41 and the brake shoe rim 47 fits the inner periphery of the impeller rim 53. Thus the impeller 51 rotatably supports the brake shoe and also rotates it by virtue of the key connection between the respective blades and slots, this connection being such as to freely permit relative axial movement of the shoe 41 along the crown 5 of the mounting sleeve 3.

Braking is accomplished by axial movement of the shoe 41 and the nonrotatable members 39 and 43. This movement results in a forced friction engagement between the radial faces of these members and the radial brake linings 49. When this frictional connection is made, as a result of axial movement caused by the piston 31, the rotary impeller 51, which is secured to a wheel, is connected to the nonrotatable sleeve 3 and thus to the chassis. The frictional engagement provides resistance to rotation of the impeller 51 and the parts attached thereto and much of the kinetic energy of the rotating members is transformed into heat at this connection as braking takes place. In accordance with the principles of this invention, a series of passages are provided in heat transfer relationship with the brake linings 49 and flow of coolant air therethrough is actuated by the impeller 51. These passages are both axially and radially directed, the enlarged aperture 45 of the shoe 41 providing means for the axial flow of air between it and the sleeve crown 5.

Figures 8, 9:
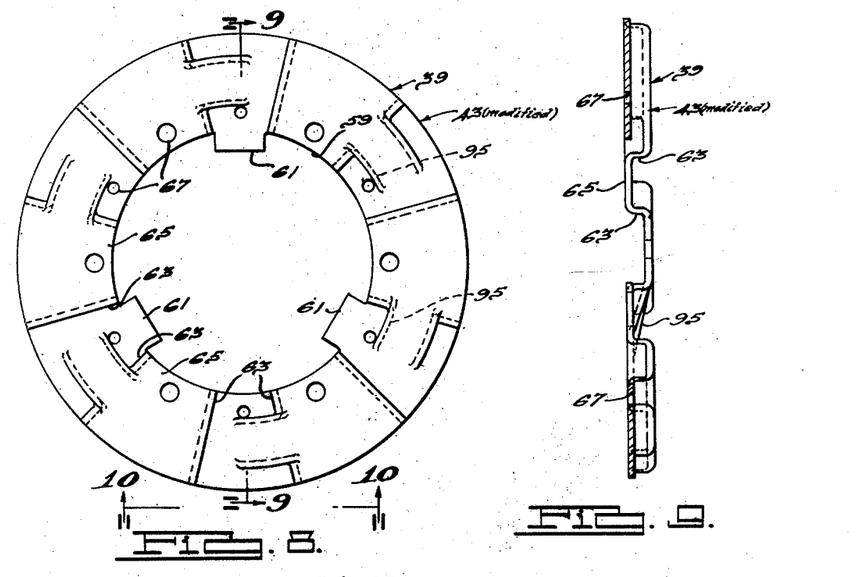
Fig. 8 is a detail plan view of the inboard disc which cooperates with the pressure disc of Fig. 6.
Fig. 9 is a diametrical section taken on the line 9—9 of Fig. 8.

The braking members 39 and 43 are nonrotatably attached to the sleeve crown 5 in such a manner that they also permit axial flow of air along the outer surface of the sleeve crown 5. As shown in Fig. 8, each member has a central aperture 59 that is substantially larger than the sleeve crown 5 but is provided with a plurality of inwardly extending radial projections 61 with flat ends which fit on the flat sides of the hexagonal crown 5 to prevent relative rotation, though permitting relative axial movement.

The braking members 39 and 43 may also provide radial passages for the flow of coolant air. This may be conveniently accomplished by fabricating these members into such a form that they may be broadly described as corrugated, this construction having the added advantages of increasing the rigidity of the members, making them adaptable to fabrication by stamping from sheet metal or the like, and most important of greatly increasing the rate of heat dissipation and lowering the temperatures within the brake. With respect to these features, the members 39 and 43 may be of identical construction. Thus, as shown in Figs. 8 and 9, the members 39 and 43, comprise discs which are formed with radial corrugations to provide channels 63 and ridges or lands 65, the inclined surfaces appearing in these figures being formed on plate 39 for the purpose of providing a self-adjusting brake as will be described hereinafter. The members are provided also with a plurality of apertures 67 which are preferably located on substantially the same diameter as the apertures 19 in the rim 8 of the mounting sleeve 3. It may be noted from Figs. 2, 3 and 5 that the corrugations in the braking member 43 fit into those formed in the rim 8 of the mounting sleeve 3 so that this interconnection serves not only to limit axial movement of the brake member 43 in the outboard direction, but also to prevent rotation of the member 43.

Figures 4, 5, 6, 7, 7A:
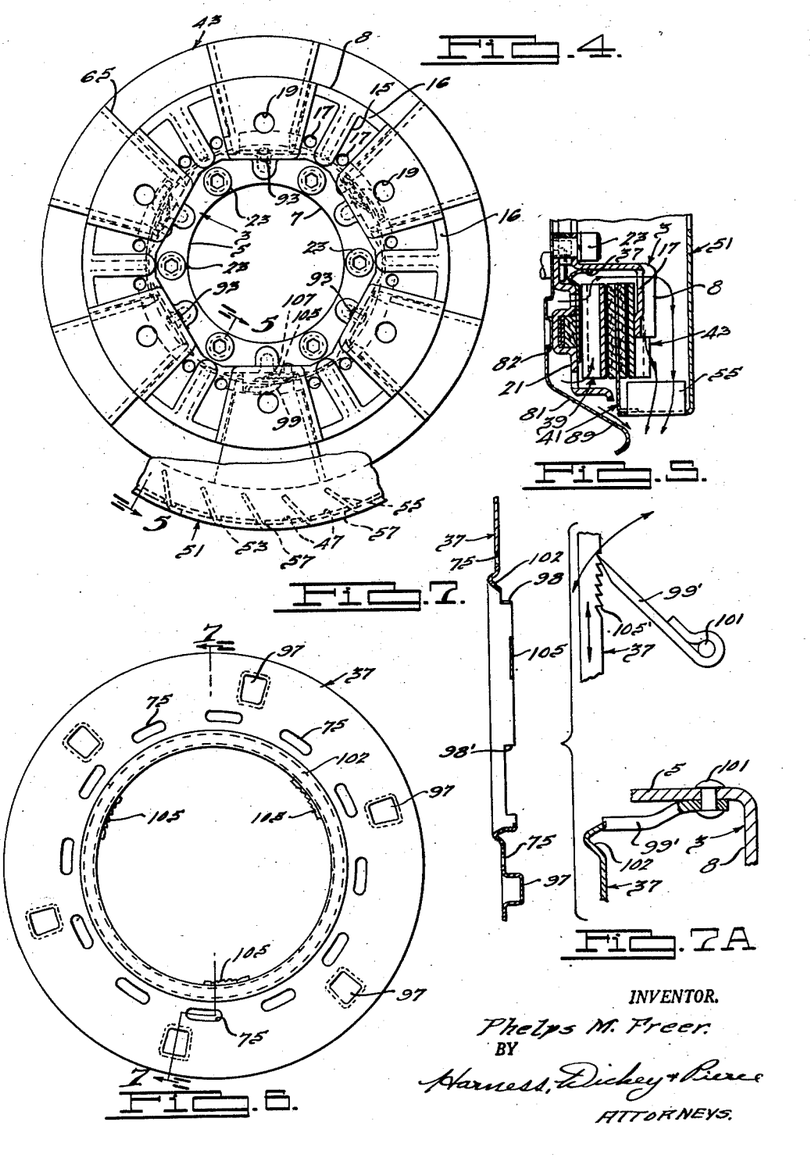
Fig. 4 is a side elevation of the construction heretofore illustrated taken from the outboard side thereof with the coolant flow impeller partially broken away as viewed from line 4—4 of Fig. 2.
Fig. 5 is a radial section taken on line 5—5 of Fig. 4.
Fig. 6 is a detail plan view of the pressure disc employed in the construction illustrated.
Fig. 7 is a section taken on the line 7—7 of Fig. 6.
Fig. 7A shows a modified form of means for rotating the cam ring.

As will be observed in Figs. 2, 3 and 5, ridges 65 on one radial face of each of the braking members 39 and 43 are disposed to engage with the radial brake linings 49 of the shoe 41. The channels 63 between the ridges 65 therefore define a series of radial passages or conduits having communication at their inner radial ends with an annular chamber 69 that surrounds the crown 5 and is formed by virtue of the enlarged apertures 45 and 59 in the shoe 41 and braking members, respectively. The radial passages so formed in the braking member 39 have communication at their outer radial ends with an annular chamber 71 which lies between the inner and outer peripheries, respectively, of the rim of housing plate 21 and the member 39. The radial passages so formed in the braking member 43 have communication at their outer radial ends with the annular chamber 73 in which the impeller blades 55 rotate as previously mentioned. Preferably, the chambers 71 and 73 are separated by the brake disc 44 so that there is no axial flow therebetween. The radial passage forming channels 63 alternately open into the linings 49 and are separated therefrom by the thickness of the discs from which the braking members are formed. In either case it is apparent that coolant flowing therethrough will receive heat resulting from frictional engagement of the ridges 65 with the brake linings 49.

Air is the most convenient coolant medium for dissipating the heat of friction and it is preferably admitted to the brake 1 on the inboard or plate 21 side, the impeller 51 thus being on the low pressure side of the system and the apertures 57 serving as outlets through which the heated air can escape. The apertures 67 in the braking member 39 receive air through slots 75 (Fig. 6) which are formed in the cam ring 37 in such a manner as to register therewith. Slots 75 rather than circular holes are preferably employed because, as will hereinafter be described, the cam ring rotates a slight amount relative to the braking member 39 and housing plate 21 during the life of the brake linings 49. Holes 77 in the plate 21 admit air to the cam ring slots 75. These holes receive air from an annular chamber 79 which is formed between the plate 21 and a cover 81 which is secured to the inboard radial face thereof and has bosses 82 bearing upon the plate 21 to separate it therefrom. It has a tapered peripheral rim 83 which extends axially to overlap the rim 53 of the impeller 51 so that these two members substantially encase the brake 1. Air from chamber 79 may also pass through holes 80 in the plate 21 into the chamber 71 at the outer periphery of the braking member 39. Air flows into the chamber 79 through an inlet opening 85 in the cover 81, which may be screened, if desired. A mud shield 87 may be provided on the cover 81 to guide air so that it must flow in a substantially circumferential or tangential direction to reach the opening 85. By virtue of this arrangement the air in annular chamber 79 is in rotation so that any particles of dust carried thereby will be thrown radially outwardly against the rim 83 of the cover 81 from whence they can escape from the brake through the annular space 89 between the rims 83 and 53.

Before proceeding to a description of the wear compensating adjustment embodied in the structure shown in the drawings, the manner in which that structure operates which has already been described will be discussed. During the period in which no braking is desired, the impeller 51 rotates with the wheel and by virtue of its interconnection with the impeller blades 55 the brake shoe 41 also rotates. Pressure has been released on the annular piston 31 so that the axially disposed compression springs 91 of a suitable form (Fig. 17) which are affixed at 93 to the sleeve crown 5 and bear upon the radial projections 61 on braking member 39, may force the braking member 39 axially inboard to expand the assembly of braking members and brake shoe 41 and prevent any substantial frictional engagement between the cooperating faces of the brake shoe and the members.

When it is desired to brake and pressure is increased on the bottom of the piston 31, it moves axially outward and forces the cam ring 37, the braking members 39 and 43, and the brake shoe to move axially in the same direction. The limit of this movement before braking occurs is defined by the rim 8 of the mounting sleeve 3. When the parts are forced against this rim, the normal force between the ridges 65 and the linings 49 causes the braking members 39 and 43 to frictionally engage the brake shoe 41 to dissipate rotative energy in the form of heat whereby deceleration occurs at a rate dependent upon the applied normal forces.

During this period of deceleration, the impeller 51 functions to lower the pressure in chamber 73 so that air is drawn through the brake to effectively remove a substantial amount of the frictional heat created. This air enters the chamber 79 through opening 85 in the manner just indicated so that dust particles are centrifugally separated therefrom. A portion of this air flows axially through holes 80 in the plate 21 into the chamber 71 and thence radially inwardly through the channels 63 in braking member 39 to the central annular chamber 69. This air therefore removes heat from the inboard brake lining 49 and the member 39. The remainder of the air in chamber 79 flows radially inwardly to holes 77 in plate 21 and thence axially through slots 75 in the cam ring 37 and holes 67 in the brake member 39 to the inner radial end of channels 63 in the member 39 whereupon it mixes with the other portion of the air passing through these channels and flows into chamber 69. This intermixture of the two portions of air lowers the temperature of that portion which has passed radially inwardly from chamber 71 so that the resulting mixture is capable of efficiently removing heat from the outboard lining 49 and the brake member 43. This is accomplished as air from chamber 69 flows radially outwardly in the channels 63 to the chamber 73 from whence it passes through apertures 57 to atmosphere. Instead of following this path, air in the chamber 69 may flow through the holes 17 in the rim 8 (Fig. 5) or through the mating holes 67 and 19 in the braking member 43 and rim 8 and thence radially outwardly to the outlet apertures 57.

While the heat removing action of the air in flowing through the brake 1 during operation thereof results in a substantial decrease in the rate of wear of the linings 49, wear inevitably occurs and it is a further function of the structure shown in the drawings to automatically compensate for such wear so that the required axial movement of the piston 31 and other parts to effect braking is substantially constant. In order to accomplish this self-adjustment, cam means are preferably used and may be provided between the cam ring 37 and the braking member 39 to increase the effective overall axial length of these parts when engaged in an amount substantially equal to the decrease in the overall axial length (or thickness) of the members 39 and 43 and brake shoe 41 because of wear of the radial faces thereof. In other words, the cam means operates to maintain substantially constant the overall length of the parts between plate 21 and the rim 8 of the mounting sleeve 3.

For this purpose, the braking member 39, as shown in Figs. 8 and 9, is provided with a plurality of cam tracks 95 which are axially tapered in a circumferential direction. These tracks rise from the channels 63 to the ridges 65 and, like the other features of construction already described in connection with the braking members 39 and 43, may be formed in a suitable blank disc of metal by pressing or stamping.

The cam ring or pressure plate 37 (Figs. 6 and 7) comprises a disc which has a plurality of cams 97 formed therein which fit in the cam tracks 95 as shown in Fig. 3. The cams 97 may be formed by a drawing operation on the disc and it will be recognized that they have a common shape which is the same as that of the cam tracks 95. Rotation of the cam ring 37 in one direction (clockwise when viewing Fig. 3 from the right) will force the cam ring and the braking member 39 apart or increase their overall axial length. The ring has an annular flange or rim 98 on its inner periphery which is adapted to fit the circular portions 11 of the crown 5 and rotate thereon. The rim may be provided with suitable cutouts 98' to receive the projections 61 on the braking member 39, these cutouts being sufficiently long to allow a limited amount of rotation of the ring 37.

Figures 16, 17, 18, 19, 20:
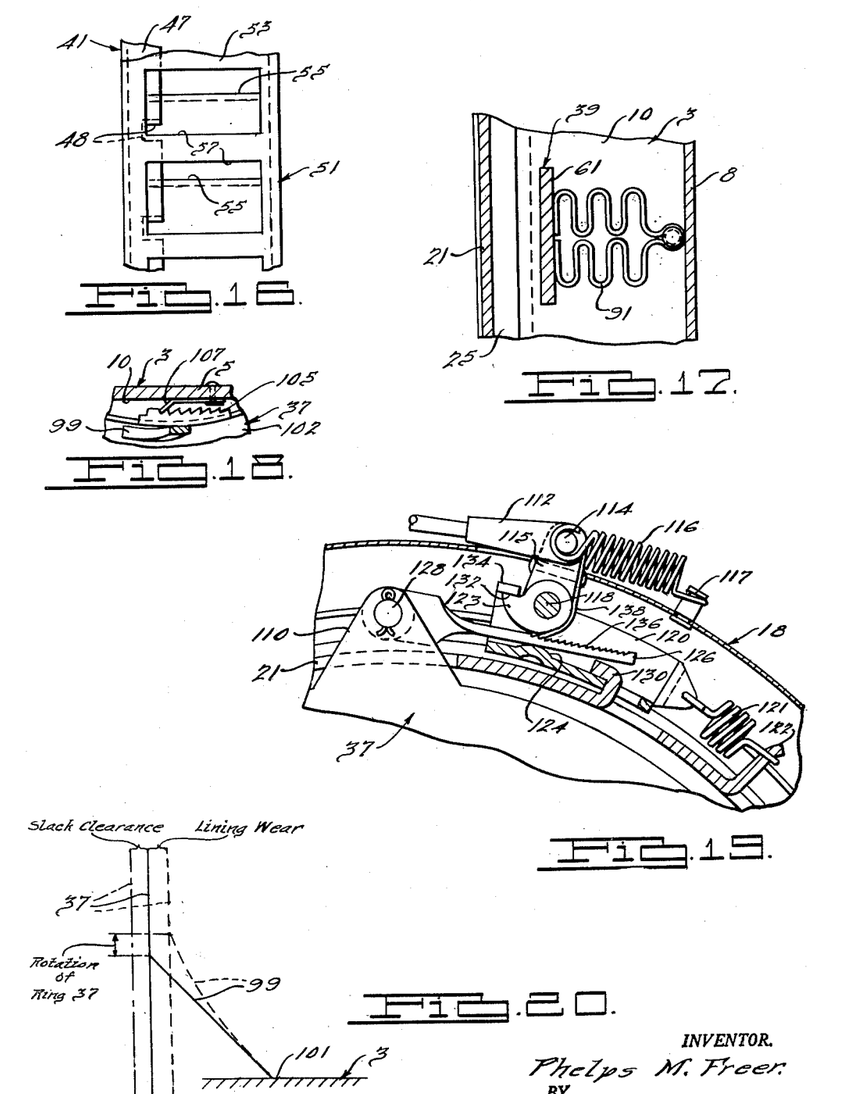
Fig. 16 is a plan view of the brake disc and impeller assembly as taken from line 16—16 of Fig. 14.
Fig. 17 is a view taken on line 17—17 of Fig. 2 showing the return springs.
Fig. 18 is a view taken on line 18—18 of Fig. 2 showing the ratchet means.
Fig. 19 is a view taken on line 19—19 of Fig. 15 showing the structure enabling the brake to be used for a parking brake.
Fig. 20 is a schematic diagram of the mode of operation of the fingers 99 which rotate the cam plate 37 to maintain constant slack clearance.

It will be evident that the cam means must include actuating means for rotating the ring 37 in response to a decrease in thickness of the shoe 41 or members 39 and 43. One means for accomplishing such rotation comprises a plurality of resilient pins 99 which are pinned to fixed points by means of rivets 101 which connect the outboard ends of the pins to the side wall of the sleeve crown 5. The pins extend axially, but not lie in planes through the axis of the brake 1, i. e. they also extend circumferentially of the axis. The free ends of the pins 99 are tapered to fit or wedge in the sides of a V-shaped annular groove 102 which is formed in the cam ring 37, this fit being such that when the pins and groove 102 are so engaged, there is no rotation of the ring 37 relative to the pins 99 in the counterclockwise direction. Reference to Fig. 20 will enable it to be readily recognized that, when this engagement of pins and groove occurs, axial movement of the ring 37, due to pressure on the piston 31, will be accompanied by rotation thereof. This is the case because the pins 99 must flex about points 101 with both axial and circumferential components of movement as defined by the arc 103 (Fig. 3). This circumferential component is transmitted to the ring 37 and causes rotation thereof in the clockwise direction to spread it and the braking member 39. When the pressure on piston 31 is released, the springs 91 force the member 39 and ring to move axially inwardly toward plate 21.

The length of the pins 99 is adjusted so that in initial assembly the pins do not rotatively engage the groove 102 until the members 39 and 43 and the brake shoe 41 are in tight braking engagement. In other words the plane defined by the free ends of the fingers 99 is spaced from the plate 37 by the amount of slack clearance when the brake is disengaged. Thus, so long as there is no wear of the linings 49, the cam ring 37 has only simple axial movement when brake pressure is applied thereto through the piston 31. When, however, some wear occurs, the required axial movement of the cam ring 37 is increased by the amount of such wear. As the ring 37 attempts to move through this axial increment, it applies force to the pins 99 which bend substantially along arc 103 about their rivet connections 101 and by virtue of their engagement with the groove 102 rotate the ring 37. The cams 97 on the ring 37 therefore ride along the cam tracks 95 to axially move the braking member 39 relative to the cam ring 37. Thus, the axial increment of increased movement required of the member 39 before it engages the brake shoe 41 is accomplished in part by axial movement of the member 39 with the ring 37 and the balance by axial movement of the member 39 relative to ring 37 due to the action of the cams. The part or component of the axial increment accomplished by movement of the member 39 jointly with the ring 37 represents the amount by which the brake is still out of adjustment. On the next application of the brake pressure, however, the operation just described will be repeated with the result that the ring 37 will be rotated by the pins 99 and the member 39 will move relatively to the ring 37 to reduce the axial component by which the brake is still out of adjustment. It will be recognized that this process will continue on successive applications of the brake until, practically at least, the wear is fully compensated for and no increase in the axial movement of piston 31 is required to engage the brake. During actual operation, the mechanism just described is continually adjusting the cams 97 in the tracks 95 to compensate for such minute amounts of wear as may occur. Thus, it will be evident that in practical effect the cam means operates to maintain a substantially constant disengaged clearance between the braking members 39 and 43 and the brake shoe 41.

In order to overcome the tendency of the pins 99 to rotate cam ring 37 in the counterclockwise direction when they flex back to their normal positions, a ratchet connection may be used between the ring 37 and the sleeve crown 5. This comprises several sets of ratchet teeth 105 formed on the inner periphery of the ring and suitable pawls 107 riveted to the crown 5. It will be apparent from Figs. 4 and 18 that though the pawls 107 will permit ring rotation in the clockwise or expanding direction, they will engage the teeth 105 to prevent counterclockwise rotation.

In a modified form of means for rotating the ring 37, the pins may be used too as ratchet pawls. As shown in Fig. 7A, the pins 99' are pointed so as to engage the ratchet teeth 105' and the latter are arranged so that the ends of the pins will seat therein to rotate the ring 37 in a clockwise direction. Relative movement in the counterclockwise direction is permitted, however, by the slanting parts of the teeth 105', it being appreciated that when pressure in piston 31 is released the force of return springs 91 makes the contact of pins 99' on teeth 105' relatively light so that the pins 99' are able to move from one tooth to another as wear occurs.

Figure 13:
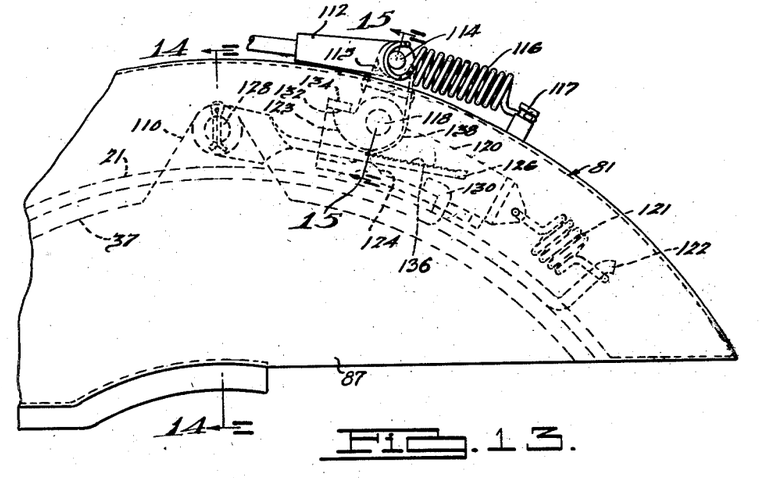
Fig. 13 is a side elevation of the parking brake attachment used with the hereindescribed brake construction; and, Figs. 14 and 15 are radial sections taken on the lines 14—14 and 15—15 of Fig. 13.
Figure 14:
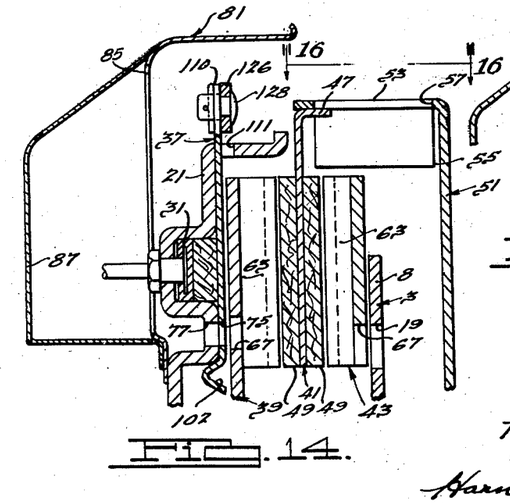
Figure 15:
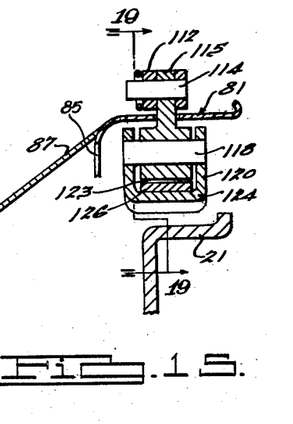

It is often desirable to be able to lock the braking members 39 and 43 and the brake shoe 41 together, as, for example, when parking a car embodying brakes of the type herein described. Mechanism for accomplishing this is shown in Figs. 13–15 and includes a radial ear 110 on the outer periphery of the cam ring 37 which extends through a suitable slot 111 in the backing plate 21. It will be evident from the preceding description that by forcing the ear 110 to the left in Figs. 13 and 19 that the ring 37 will be rotated so that its cams 97 force the braking members 39 and 43 to tightly engage the brake shoe 41. The member 112 serves as a link which may be connected to the parking brake handle (not shown) whereby force may be applied to lock the brake. The link 112, which is above the cover 81, has a bifurcated end (Fig. 15) which is pivotally connected by means of a pin 114 to an arm 115. A tension spring 116 is inserted between the pin 114 and a pin 117 that is affixed to the cover 81 to yieldably resist movement of the link 112 to the left. The arm 115 extends inwardly through a suitable aperture in the cover 81 and is pivotally connected by means of a pin 118 to the sides of an elongated U-shaped bracket 120 which is adapted to slide or move circumferentially on or just above the outer periphery of the rim of plate 21, and is yieldably prevented from counterclockwise movement by a tension spring 121 attached thereto and to a suitable ear 122 on the stationary plate 21. The lower periphery of the arm 115 comprises a cam surface 123 which has an increasing radius forward from the pin 118. The bracket 120 may have a ridge 124 formed in the bottom thereof which cooperates with the cam 123 to form a pincers for fixing a tongue 126, which is received therebetween, to the bracket 120. The tongue 126 is pivoted at 128 to the ear 110.

When the parking brake handle is actuated to pull link 112 to the left in Fig. 13, the lever or arm 115 pivots about pin 118 so that the cam surface 123 securely clamps the tongue 126 to the ridge 124 on channel bracket 120. Continued movement of the link 112 causes the clamped assembly comprised of tongue 126, bracket 120 and arm 115 to move to the left. This rotates the cam ring 37 and applies the brake. The mechanism is locked in this position by means of a conventional locking device on the brake handle (not shown) which resists movement of the link 112 to the right. When it is desired to free the brake, the link 112 is unlocked and the spring 121, which is stronger than spring 116, pulls the clamped assembly to the right. This movement continues until an ear 130 on the backing plate 21 strikes the bottom of a slot (not shown) in which it rides that is in the channel bracket 120. Spring 116 then rotates the arm 115 in the clockwise direction until a flat 132 on the cam 123 engages a stop 134 on the upper side of the bracket 120. This frees the tongue 126 so that the cam ring 37 is free to rotate under the influence of the pins 99 as previously described.

It will be evident upon consideration of the action of the ratchet teeth 105' and pawl 107 and the teeth 105 and pins 99' that these ratchet means should not be used with the parking brake mechanism just described since they will prevent the ring 37 from rotating back to the position it occupied before the brake was applied. It is desirable, nevertheless, to provide means for preventing undesired backward rotation of the ring 37 and this can be conveniently accomplished by means of the tongue 126. For this purpose the tongue 126 is provided with a series of serrations or ratchet teeth 136. These teeth are engaged by a pawl 138 which may be secured by rivets or other suitable means to the lever arm 115. It will be apparent from Fig. 13 that the pawl 138 engages the teeth 136 to prevent movement of the tongue 126 to the right or movement of the ring 37 in a direction to reduce the clearance between it and member 39. When the parking brake is actuated, the pawl 138 may become disengaged from the teeth 136, but its locking action is not required during this period since the cam 123 fixedly clamps the tongue 126 to the bracket 120 which has a fixed rotary position defined by the ear 130.

It will now be recognized that the brake of the present invention may be economically manufactured since all of the major parts, exclusive of the parking brake mechanism, may be fabricated from sheet metal by suitable press operations. The corrugated construction of the braking members 39 and 43, in particular, greatly increases their strength and, because of the resulting increased surface area it greatly increases their ability to radiate heat. In heat dissipating properties these brake members are about twice as efficient as conventional brake discs formed from the same gauge metal. Due to the interrupted radial faces resulting from the formation of channels 65, much higher unit braking pressures may be employed than heretofore without danger of burning the linings. The cooling system employed with the corrugated construction also serves to increase the rate of heat dissipation.

As a result of these features the brake of the present construction is much smaller than a conventional brake of the same capacity.

Those in the art will recognize other advantages of the invention and will also realize that a rather wide modification may be made in the specific details illustrated, without departure from the principles thereof.

What is claimed is:

1. A rotary brake construction comprising a fixed support, a rotatable brake shoe member mounted on the support having a radial friction surface thereon, a disc member mounted on the support having a radial surface for engagement with the brake shoe surface, said brake shoe member being rotatable with the object to be braked and the other member being non-rotatable but axially movable, a movable actuator on the support for axially moving the members, means whereby rotation of the actuator axially moves said disc member, and a fixed length flexible member secured to the support and engageable with the actuator for rotating the same upon relative axial movement between the actuator and support.

2. The invention as claimed in claim 1 wherein the fixed length member is obliquely disposed with respect to the rotary plane of the actuator and has one end fixed and a free end engageable with the actuator.

3. A rotary brake construction comprising a rotatable brake shoe member having a radial friction surface thereon, a disc member having a radial surface for engagement with the brake shoe surface, one of said members being rotatable with the object to be braked and the other non-rotatable but axially movable, a movable actuator for axially moving the members, power operated means for axially but non-rotatably moving the actuator to effectuate braking, means whereby rotation of the actuator axially moves said disc member, a flexible member engageable with the actuator for rotating the same in one direction upon axial movement thereof in one direction, and ratchet means for preventing rotation of the actuator in the opposite direction.

4. A rotary brake construction comprising a brake shoe member having a radial friction surface, a member for braking engagement with the brake shoe member, one of the members being rotatable with the object to be braked, one of the members being axially movable into engagement with the other, an actuator member for moving the last-mentioned member, said actuator member and last member being capable of relative axial and rotary movement, power operated means for axially but non-rotatably moving the actuator to effectuate braking, means whereby relative rotation of the actuator and last member causes axial movement of the member, and a rotator for one of the last two mentioned members for causing such relative rotation and operated upon predetermined axial movement of such member relative to a fixed point.

5. A rotary brake construction comprising a brake shoe member having a radial friction surface thereon, a disc member having a radial surface for engagement with the brake shoe surface, one of said members comprising the rotary member to be braked and the other comprising the braking member, one of said members being axially movable, a pressure disc member capable of force transmitting engagement with one surface of the axially movable member for moving the opposite surface into engagement with the other member, power operated means for axially but non-rotatably moving the members to effectuate braking, and automatic means for increasing the overall axial length of the engaged disc and member in amounts substantially equal to decreases in the overall axial length of the engaged members, said means including cam means operated upon said decreases in length to spread said disc and member.

6. A rotary brake construction comprising a brake shoe member having a radial friction surface thereon, a disc member having a radial surface for engagement with the brake shoe surface, one of said members being rotatable with the object to be braked and the other non-rotatable but axially movable, a pressure disc member capable of axial movement and force transmitting engagement with one surface of the axially movable member for moving the opposite surface into engagement with the other member, power operated means for axially but non-rotatably moving the members to effectuate braking, cam means between the pressure disc member and axially movable member for governing the overall axial length thereof, and means actuated upon a decrease in the thickness of the brake shoe for operating the cam means to increase said length in an amount substantially equal to said decrease in the thickness or axial length of the brake shoe, said means including a resistor normally out of operative engagement with said axially movable members but engaged by one of said axially movable members upon decrease in the thickness of the shoe.

7. A rotary brake construction comprising a brake shoe member having a radial friction surface thereon, a disc member having a radial surface for engagement with the brake shoe surface, one of said members comprising the rotary member to be braked and the other comprising the braking member, one of said members being axially movable, a pressure disc member capable of force transmitting engagement with one surface of the axially movable member for moving the opposite surface into engagement with the other member, power operated means for axially but non-rotatably moving the members to effectuate braking, said pressure disc being rotatable, means operable by rotation of the disc in one direction for moving the axially movable member toward the brake shoe member, and means responsive to wear of the radial surfaces for rotating said disc in an amount proportional to said wear.

8. A rotary brake construction comprising a brake shoe member having a radial friction surface thereon, a disc member having a radial surface for engagement with the brake shoe surface, one of said members comprising the rotary member to be braked and the other comprising the braking member, one of said members being axially movable, a pressure disc member capable of force transmitting engagement with one surface of the axially movable member for moving the opposite surface into engagement with the other member, power operated means for axially but non-rotatably moving the members to effectuate braking, said pressure disc being rotatable, means operable by rotation of the disc in one direction for moving the member toward the other member, and means separate from said power operated means for rotating the disc in an amount proportional to an increase in axial movement required between successive engagements to engage the members.

9. A brake construction comprising a pair of members having radial frictional engaging faces, one of the members being rotary and the other stationary, means for engaging and disengaging the members to effect braking, means providing radial passages in the members for the flow of air therethrough, common means for rotating the rotary member and causing flow of air through said passages, a cover including an annular rim surrounding the members and providing a chamber for air in communication with the passages, and means for admitting air to the chamber in a direction tangential to the rim whereby centrifugal separation of solid particles from the air is effected in said chamber.

10. A rotary friction brake comprising a support member adapted for fixed connection to a non-rotatable object, said member having a substantially flat sided outer circumference, a brake shoe having opposite radial friction faces disposed on the member for rotary and axial movement relative thereto, braking members on opposite sides of the shoe having circumferentially spaced projections fitted to the flat sides of the member, means for axially moving the braking members to effect friction engagement thereof with opposite sides of the brake shoe, and springs affixed to the flat sides of the support member and engageable with the projections for yieldably separating the braking members and shoe.

11. A rotary friction brake comprising a support member adapted at one end for fixed connection to a non-rotatable object and having a radial outwardly extending flange at the other end, the central portion of said member having a substantially flat sided outer circumference, a brake shoe having opposite radial friction faces disposed on the member for rotary and axial movement relative thereto, braking members on opposite sides of the shoe having circumferentially spaced projections on the inner peripheries thereof fitted to the flat sides of the member, a pressure member mounted on the support member remote from the flange and adapted upon movement in the direction of the flange to force the members and shoe thereagainst to effect braking, means whereby rotation of the pressure member causes axial movement of the members toward the flange, flexible actuator members secured to the flat sides and extending between said projections and engageable with the pressure member to cause rotation thereof, and springs affixed to the flat sides of the member and engageable with the projections to yieldably resist movement toward the flange.

12. A rotary friction brake comprising a support member adapted at one end for fixed connection to a non-rotatable object and having a radial outwardly extending corrugated flange at the other end, the central portion of said member having a substantially flat sided periphery, a brake shoe having opposite radial friction faces disposed on the member for rotary and axial movement relative thereto, a rotatable flow actuating impeller, said brake shoe being mounted on the impeller for rotation therewith and axial movement relative thereto, radially corrugated braking members on opposite sides of the shoe having circumferentially spaced projections on the inner peripheries thereof fitted to the flat sides of the member, said brake shoe and braking members defining a chamber around the flat sides of the support member, having fluid communication with the channels formed in the corrugated braking members, said braking member corrugations having fluid communication with said impeller whereby the impeller actuates flow through said chamber and members, a pressure member mounted on the support member remote from the flange and adapted upon movement in the direction of the flange to force the members and shoe thereagainst to effect braking, means whereby rotation of the pressure member causes axial movement of the members toward the flange, flexible actuator members in said chamber secured to the flat sides and extending between said projections and engageable with the pressure member to cause rotation thereof, and springs in said chamber affixed to the flat sides of the member and engageable with the projections to yieldably resist movement toward the flange.

13. The invention as claimed in claim 11 wherein the support member includes cylindrical segments joining the edges of the flat sides and the pressure member is rotatably mounted on said segments.

14. A support member for disc-type brakes having axially movable braking members engageable with a radially friction faced brake shoe member comprising a sleeve having a substantially flat-sided outer circumference to non-rotatably support certain of said members, and provide chambers between the flat sides and such cylinder as may surround the periphery, said sleeve being adapted at one end for fixed connection to an object and having a radial outwardly extending flange at its opposite end, said flange serving as a fixed abutment to limit movement of the members mounted thereon in one direction when braking forces are applied thereto in said one direction.

15. In a disc brake construction, the combination of a brake shoe disc, a braking disc for engagement with the brake shoe disc, an actuator member operatively connected to one of the discs for moving the discs into engagement, said member being movable axially to effect disc engagement, a pressure actuated piston for axially moving the member to engage the discs, said member having a cam surface thereon, one of said discs having a complementary cam surface engaging the member cam surface whereby rotation of the member moves said one of the discs toward the other, means actuated when there is wear of the brake shoe for rotating the member to take up the loss in thickness due to wear and thereby maintain the overall length of the discs and members and the clearance therebetween substantially constant whereby said piston has a substantially constant stroke despite wear of the brake shoe.

16. In a disc brake construction, the combination of an impeller having a radial face adapted for driven attachment to a wheel and a circular circumferential flange with radially inwardly extending fan blades formed therein, a circular disc having a circumferential flange fitting inside the impeller flange, said disc flange having notches therein receiving said blades whereby a keyed rotary connection is effected between the impeller and disc, and brake lining in a radial face of the disc whereby it comprises a brake shoe.

17. In a disc brake, a brake operator which operates axially and applies an axial force, a support for reacting against said axial brake operating force, annular braking members radial to said force movably mounted between and operatively connected to said operator and support, whereby radial faces of said members are pressed together to effect braking upon application by the operator of an axial force and wear of said radial faces has a tendency to increase the stroke of said operator, means for overcoming said tendency and maintaining a substantially constant operator stroke comprising an adjustable member mounted between said operator and support in axial force transmitting alignment with the braking members, said means being of an adjustable effective axial length and adjusted in said length by adjustment of said member, and a movable adjuster for said adjustable member to increase the effective axial length of said means by amount corresponding to the wear of said radial faces, said adjuster being effectively disconnected from said members during a predetermined normal operator stroke but engageable with the adjustable member and movable upon increase in stroke to effect said increase in member length.

18. In a disc brake the combination of a first rotatable member to be braked, a second braking member operatively engageable with the first member to effect braking, one of said members being axially movable to effect such engagement, return spring means urging said members out of operative engagement, there being a predetermined slack clearance between said members, a reciprocable brake actuating element having a predetermined operating stroke beginning at a predetermined position, connecting means operated by the element and transmitting force and motion of the element to the axially movable member and having a constant maximum length when operated solely by the element, said connecting means including length increasing means for increasing the length of the connecting means in accordance with wear of the members and thereby maintaining constant said predetermined operating stroke and position, actuating means for operating the length increasing means, said actuating means being engaged and operated by one of said members when said return spring means forces said members apart beyond said predetermined slack clearance.

PHELPS M. FREER.

References Cited in the file of this patent
UNITED STATES PATENTS

| Number | Name | Date |
|---|---|---|
| 1,525,568 | Chapin | Feb. 10, 1925 |
| 1,566,569 | Anderson | Dec. 22, 1925 |
| 1,604,060 | Matthews | Oct. 19, 1926 |
| 1,740,993 | McDonnell | Dec. 24, 1929 |
| 1,950,381 | Bartz | Mar. 13, 1934 |
| 1,989,179 | Versluis | Jan. 29, 1935 |
| 2,024,328 | Batie | Dec. 17, 1935 |
| 2,031,742 | Smith et al. | Feb. 25, 1936 |
| 2,095,094 | Glasner | Oct. 5, 1937 |
| 2,109,637 | Gutkaiss | Mar. 1, 1938 |
| 2,165,978 | Miller | July 11, 1939 |
| 2,317,599 | Freer | Apr. 27, 1943 |
| 2,384,297 | Goepfrich | Sept. 4, 1945 |